United States Patent [19]

Knepper

[11] 4,271,211

[45] Jun. 2, 1981

[54] PROCESS FOR MAKING PLASTIC RESIN-DYESTUFF CONCENTRATES FOR USE IN THE DYEING OF PLASTIC RESINS

[75] Inventor: Siegfried Knepper, Radevormwald, Fed. Rep. of Germany

[73] Assignee: Karl Finke OHG, Wuppertal-Barmen, Fed. Rep. of Germany

[21] Appl. No.: 913,864

[22] Filed: Jun. 8, 1978

[30] Foreign Application Priority Data

Mar. 18, 1978 [DE] Fed. Rep. of Germany ....... 2811922

[51] Int. Cl.³ .............................................. B05D 3/00
[52] U.S. Cl. .................. 427/195; 106/308 Q; 106/308 F; 106/308 M; 106/272; 260/28.5 A; 260/42.21; 264/117; 427/222; 428/407
[58] Field of Search .......... 106/308 Q, 308 F, 308 M, 106/308 N; 260/28.5 A; 427/195, 222; 264/117

[56] References Cited

U.S. PATENT DOCUMENTS

| | | |
|---|---|---|
| 2,511,901 | 6/1950 | Bunn .................................... 264/117 |
| 3,723,153 | 3/1973 | Nagata et al. ......................... 427/222 |
| 3,813,259 | 5/1974 | Neubert ................................ 427/222 |
| 4,040,997 | 8/1977 | Van Vonno et al. ................ 428/407 |
| 4,105,464 | 8/1978 | Osswald et al. ................ 106/308 M |
| 4,116,909 | 9/1978 | Muller ............................ 106/308 M |
| 4,127,421 | 11/1978 | Ferrill ............................. 106/308 M |

FOREIGN PATENT DOCUMENTS 2318635 11/1974 Fed. Rep. of Germany ....... 106/308 F
2418066 11/1975 Fed. Rep. of Germany ....... 106/308 F

*Primary Examiner*—Helen M. McCarthy
*Attorney, Agent, or Firm*—Michael J. Striker

[57] ABSTRACT

Thermoplastic base resin-dyestuff concentrates for use in the dyeing of thermoplastic base resins are made by forming an intimate mixture of a pulverulent or granular thermoplastic base resin with a dye and a wax at a temperature of about 35° to 160° C., the wax being solid at room temperature and being liquefied at the mixing temperature. The thus-formed mixture is then subjected to cooling and may later be used in the manufacture of colored products.

5 Claims, No Drawings

4,271,211

PROCESS FOR MAKING PLASTIC RESIN-DYESTUFF CONCENTRATES FOR USE IN THE DYEING OF PLASTIC RESINS

BACKGROUND OF THE INVENTION

The invention relates to coarse or fine grained thermoplastic base resin-dyestuff concentrates and their manufacture.

Thermoplastic base resins normally are furnished to the manufacturer of the final products of synthetic plastic materials in an undyed condition as a powder or granulate. The dyeing of the plastic resins for making colored products is then effected usually by adding the dyestuffs to the thermoplastic base resin hereinafter referred to simply as "resin," prior or during the introduction into the molding or similar machine, for instance an injection mold, a kneader or an extruder. This procedure frequently fails to lead to a complete mixing of the dyestuff with the resin. The dyeing of the product therefore is frequently obtained in a non-homogeneous speckled way.

The industry therefore prefers to use concentrates of dyestuff and resin for the dyeing of synthetic plastic material. In these concentrates, resins are intimately blended with large amounts of a dyestuff. The resin then acts in the resin-dyestuff concentrate as a kind of solution promoter between the dyestuff and the undyed "dilution" resin to be colored, thereby providing a homogeneously dyed product.

The making of the resin-dyestuff concentrates, which are also called "master batches", is done in a manner similar to the dyeing of thermoplastic resins with dyes, in injection molds, leaders or extruders, except that a particularly high ratio of dyestuff to resin is necessary and the blended material is eventually comminuted to a granulate.

It is evident that this kind of manufacture of resin-dyestuff concentrates is practical only for large amounts. For making smaller amounts of a specific dye color this process is uneconomical since the injection molds, extruders and kneaders can be operated economically only with large throughputs of materials.

It is therefore an object of the invention to provide for an economical way to form resin-dyestuff concentrates from inorganic or organic dyestuffs. It will be understood that the term "dyestuff" in this connection also includes the inorganic pigments.

SUMMARY OF THE INVENTION

This object is accomplished by forming an intimate mixture of a thermoplastic base resin with a dyestuff and a wax at a temperature of about 35° to 160° C., preferably at a temperature of 40° to 90° C., the wax being solid at room temperature but liquefied at the mixing temperature. This step is then followed by cooling of the mixture which is then available for making the final product.

The thus-formed concentrate constitutes a fine to coarse dyed material which is suited as master batch for thermoplastic and thermosetting resins. Depending on the grain size of the resin granulate the concentrate has a grain range between about 0.1 to 6 mm. Resin-dyestuff concentrates from resins of a broad range between about 2 to 5 mm grain size usually have also a wide grain size and can then be separated in classifiers into the specific grain fractions desired in the final concentrate.

An examination of the agglomerates formed by the process of the invention shows, if necessary after destroying individual grains, that one or several resin granulates are simultaneously blended with a wax-dyestuff mixture to form agglomerates. This is discernible with the naked eye or with an ordinary magnifying glass.

The resin-dyestuff concentrates are eminently suitable for dyeing resins of highly different types. The waxes in these cases apparently act additionally as solution promoter for the resins to be dyed. Thus, they result in an excellent blending effect between the resin and the dyestuff in the resin-dyestuff concentrate. A blending by melting together of the components in an extruder or kneader can thus be dispensed with.

The invention is useful for making all types of resin-dyestuff concentrates in large and small amounts. Excellent results are obtained by first preparing a mixture of the wax and the dyestuff and then adding this mixture to the resin which has been preheated to the dyeing temperature. Alternatively, it is also possible to add the two components, the wax and the dyestuff, separately, that is, consecutively or simultaneously to the resin and then subject all three components to a simultaneous heating step in the mixer.

The thus-obtained pourable mass constitutes a master batch of excellent properties which particularly, because of its good pouring properties, can be added to the final processing machine in exact dosages.

As dyestuff there may be used all kinds of dry soluble and insoluble dyestuffs which are normally available in powdered form. These powders usually have a grain size of 0.1 to 100 microns. The grain size of the particles of the resin should be between about 1 and 6 mm. However, it is possible also to use a more coarse or finer resin material for making the resin-dyestuff concentrates. The waxes used in the invention are available in the form of powders, flakes and slabs.

The weight ratio of dyestuff to resin should be within the range as it is normally used for resin-dyestuff concentrates in molding and similar machines. Accordingly, 0.5 to 6 parts by weight of dyestuff may be used for each part of resin. The necessary amount of wax is small. About one-tenth to one-half parts by weight of the wax may be used for each part of resin.

As waxes there may be used all available waxes or wax mixtures having a melting point above room temperature. This means that the waxes should be solid at room temperature but should melt without decomposition above a temperature of about 35° to 40° C. An exhaustive listing of all available natural or synthetic waxes is evidently not feasible. Reference is therefore made to the Chemie, Lexikon by Römpp, 7th edition, chapter on Waxes, pages 3857 to 3858.

Since the industry usually does not like to operate with products of varying properties, preference may be given to synthetic waxes having specific properties and in particular specific melting points.

DETAILS OF THE INVENTION AND PREFERRED EMBODIMENTS

Examples of suitable waxes are for instance the waxes of the Hoechst Co., sold under the name 0.0 wax (a partially saponified ester wax from montanic acid; solidifying point 74° to 79° C.), E-waxes (ester waxes from montanic acids; solidifying point 70° to 74° C.), G- waxes (amide waxes; solidifying point 135° to 140° C.), GL3-waxes (a synthetic partially saponified wax; solidifying point 88° to 93° C.), PA 190-wax (a polyethylene wax, molecular weight about 9000, solidifying point 127° to 133° C.); PA 520-wax (a polyethylene wax, molecular weight about 2000; solidifying point 90° to 94° C.). Furthermore, useful are also waxes of the BASF Co. of Ludwigshafen, West Germany, for instance the AL 61-wax (a polyethylene wax of medium density and medium molecular weight with a solidifying point of 98° to 103° C.).

Preferred are those waxes which also have a surface active effect and therefore additionally contribute to the uniform distribution of the particular dyestuff in the resin. Suitable in this connection are for instance polyoxyethylene-alkarylether ("Renes 649 and 650") as well as polyoxyethylene-oxypropylene-monostearate.

An excellent effect regarding the distribution properties of the different material have particularly sorbitan containing surface active agents which permit to obtain particularly homogeneous color results. Useful in this connection are particularly polyoxyethylene-sorbitan-monostearate ("Tween 61"), polyoxyethylenetristearate ("Tween 65"), sorbitan-tristearate ("Span 65"), sorbitan-monostearate ("Span 60"), sorbitan-monopalmitate ("Span 40") as well as polyoxyethylene-sorbitan-beewax derivatives.

With most pulverulent dyestuffs it is possible also to use waxes which are liquid at room temperature in amounts up to about 5% since pulverulent materials absorb small amounts of liquid without any noticeable effect on their property as a pulverulent material.

It is possible to add to the mixture of resin, wax and dyestuff also other additives which are useful for the properties of the master batch such as stabilizers, flame inhibiting materials, UV absorbers, optical brighteners, blocking agents and/or propulsion agents. In order to improve the mixing of the resins with the dyestuffs and the waxes and prevent adhering of the mass to the heating surfaces of the mixer, it is advisable to use a mixer which is provided with stirring members. The propeller wings of the stirrers will not only improve the mixing of the material but will also pass closely by the heated portions of the mixer and thus loosen again temporary adhesions to the heating surfaces. Suitable are particularly tanks with heated wall portions which are provided with stirrers which swipe closely along the interior wall of the tank. Electrically heated tanks are suited as well as tanks having a separate jacket in which the heat exchange agent, for instance steam, is passed.

The following examples will further illustrate the invention.

EXAMPLE 1

500 parts by weight of ultramarine blue of a grain size of 1 to 14 micron are intimately mixed with 125 parts by weight of the so-called C-wax of the Hoechst Co. (an amide wax with a solidifying point of 135° to 140° C.). The mixture is then added in batches to 75 parts by weight of a polystyrene that has been preheated to 160° C. and principally consists of grains of the size of 2 to 6 mm. The granulate is continuously agitated by means of stirrers moving at a speed of 300 rpm. The formed pourable mass is discharged through a bottom drain of the tank after cooling to 30° C. and then again collected. There is obtained a non-dusting resin-dyestuff concentrate of a grain size of about 3 to 7 mm which is highly suited for the dyeing of polystyrene products.

EXAMPLE 2

250 parts by weight of $TiO_2$-pigment of a grain size of 0.1 to 1 micron were intimately mixed with 80 parts by weight of a polyethylene wax of the Hoechst Co. of a solidifying point of 127° to 138° C. and were then added into a mixture which had been preheated to 150° C. and filled with 50 parts by weight of polyvinylchloride of a grain size of 2 to 4 mm. The mass was agitated then for 10 minutes while being heated and stirred at a speed of 450 rpm. The resulting pourable mass was then permitted to cool off. The tiltable tank was then emptied via a slide to cause the material to be poured into bags.

There was obtained a non-dusting white resin-dyestuff concentrate of a grain size of 2.5 to 5 mm which was excellently suited for dyeing polyvinylchloride, for instance polyvinylchloride compounds. Foils of polyvinylchloride of a thickness of 1 mm produced in this manner showed an almost homogeneous coloring.

As a further test a master batch was prepared under the same conditions using, however, the $TiO_2$ with the above-identified Span 60 wax and mixing this material at a temperature of 60° with polyvinylchloride. The dyeing of polyvinylchloride with the same amount of master batch as above (weight ratio 10:1) resulted in a completely homogeneously dyed foil. This comparison shows the particular usefulness of sorbitan containing waxes having surface active characteristics.

EXAMPLE 3

A mixture of 40 parts by weight of a phthalocyanine of a grain size of 0.2 to 2 microns and 60 parts by weight of Span 65 were passed into a tank which had been preheated to 90° C. and was filled with 100 parts by weight of polyethylene of a grain size of 3 to 5 mm. The granulate was subjected to stirring at a speed of 400 rpm and was gradually cooled to 50° C.

The final pourable mass was thereafter discharged through a bottom valve of the stirring tank after complete cooling. There was obtained a colored master batch of a grain size of 3.5 to 5.5 mm.

This material was particularly suited for the dying of polyethylene.

EXAMPLE 4

70 parts by weight of $TiO_2$ were intimately mixed with 3 parts by weight of soot and 10 parts by weight of Span 65 wax and were then added to an amount of 50 parts by weight of a butadiene-styrene copolymer of a grain size of 1 to 4 mm which had been preheated to 65° C.

The granulate was subjected to stirring at 300 rpm and the mass was then cooled in the tank to 50° C. There were then added again 5 parts by weight of the Span 65 weight and after further stirring for 5 minutes the mass was permitted to cool off completely. The pourable mass was then discharged through a bucket wheel valve provided in the floor of the stirring tank. There was obtained a grey master batch of a grain size of about 1.5 to 4.5 mm. This master batch was particularly suited for dyeing polystyrene, polyethylene, polypropylene, polyvinylchloride, polyethylene-polyvinylacetate and acryl-butadiene-styrene.

In the above examples the individual components were mixed with each other in mixers operating in a discontinuous manner. The term "mixing" as used herein should include all kinds of known mixing techniques by which a molten material is blended with a powder or granulate.

The process can therefore be carried out also in a rotary revolving furnace in a continuous operation.

It is also possible to spray the wax-dyestuff mixture onto the resin granulate. It is furthermore possible to dip the resin which had been placed in a permeable container briefly into the liquefied wax which contains the dyestuff.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of coloring particulate thermoplastic resins, consisting in the steps of:
    mixing a particulate dye with a particulate wax which is solid at room temperature but liquefies at temperatures of about 35° C.;
    heating a particulate thermoplastic resin to a temperature between about 35° C. and 160° C. at which it softens but remains in particulate state;
    adding the mixture of particulate dye and particulate wax to the heated thermoplastic resin, so that the wax becomes liquefied due to the heated condition of the thermoplastic resin;
    mixing the resulting composite so that the liquefied wax coats the resin particles and adheres dye to them; and
    thereafter cooling the composite to below the liquefying point of the wax to obtain a pourable agglomerate.

2. The process of claim 1 wherein the heating temperature is between 40° and 90° C.

3. The process of claim 1 wherein about one-half to 6 parts by weight of dye are employed for each weight part of thermoplastic base resin.

4. The process of claim 1 wherein the wax is a wax with surface active properties.

5. The process of claim 4 wherein the wax is a sorbitan containing wax with surface active properties.

* * * * *